US010099202B2

(12) United States Patent
Smith et al.

(10) Patent No.: US 10,099,202 B2
(45) Date of Patent: Oct. 16, 2018

(54) WATER-RESISTANT COMPOSITION (71) Applicant: Anglo Platinum Marketing Limited, London (GB)

(72) Inventors: Andrew William John Smith, Berkshire (GB); Elizabeth Rowsell, Middlesex (GB); Stephen Poulston, Berkshire (GB)

(73) Assignee: ANGLO PLATINUM MARKETING LIMITED, London, England ( * ) Notice: Subject to any disclaimer, the term of this patent is extended or adjusted under 35 U.S.C. 154(b) by 342 days.

(21) Appl. No.: 14/901,501

(22) PCT Filed: Jun. 25, 2014

(86) PCT No.: PCT/GB2014/051947
§ 371 (c)(1),
(2) Date: Dec. 28, 2015

(87) PCT Pub. No.: WO2014/207467
PCT Pub. Date: Dec. 31, 2014

(65) Prior Publication Data
US 2016/0151761 A1    Jun. 2, 2016

(30) Foreign Application Priority Data
Jun. 28, 2013    (GB) .................................. 1311594.4

(51) Int. Cl.
| *B01D 53/02* | (2006.01) |
| *B01J 20/18* | (2006.01) |
| *A23B 7/157* | (2006.01) |
| *B01J 20/24* | (2006.01) |
| *B01J 20/28* | (2006.01) |
| *B01J 20/30* | (2006.01) |
| *B01J 20/32* | (2006.01) |
| *B01J 29/44* | (2006.01) |
| *B01D 53/04* | (2006.01) |
| *B01J 37/02* | (2006.01) |
| *B01J 20/26* | (2006.01) |
| *B01J 33/00* | (2006.01) |

(52) U.S. Cl.
CPC ............. *B01J 20/186* (2013.01); *A23B 7/157* (2013.01); *B01D 53/02* (2013.01); *B01D 53/04* (2013.01); *B01J 20/24* (2013.01); *B01J 20/261* (2013.01); *B01J 20/262* (2013.01); *B01J 20/2803* (2013.01); *B01J 20/28033* (2013.01); *B01J 20/28035* (2013.01); *B01J 20/3042* (2013.01); *B01J 20/3206* (2013.01); *B01J 20/3238* (2013.01); *B01J 29/44* (2013.01); *B01J 37/0219* (2013.01); *A23V 2002/00* (2013.01); *B01D 2253/1085* (2013.01); *B01D 2253/25* (2013.01); *B01D 2257/708* (2013.01); *B01D 2257/7022* (2013.01); *B01J 33/00* (2013.01); *B01J 2220/46* (2013.01); *B01J 2229/186* (2013.01)

(58) Field of Classification Search
CPC ................ A23B 7/157; A23V 2002/00; B01D 2253/1085; B01D 2253/25; B01D 2257/7022; B01D 2257/708; B01D 53/02; B01D 53/04; B01J 20/186; B01J 20/24; B01J 20/261; B01J 20/262; B01J 20/2803; B01J 20/28033; B01J 20/28035; B01J 20/3042; B01J 20/3206; B01J 20/3238; B01J 2220/46; B01J 2229/186; B01J 29/44; B01J 33/00; B01J 37/0219
See application file for complete search history.

(56) References Cited

U.S. PATENT DOCUMENTS

| 8,480,794 B2 | 7/2013 | Ilkenhans et al. | |
| 8,491,705 B2 * | 7/2013 | Choi | B01D 53/02 |
| | | | 95/114 |
| 9,186,649 B2 | 11/2015 | Ilkenhans et al. | |
| 2001/0008949 A1 * | 7/2001 | Wu | B01J 27/22 |
| | | | 585/420 |
| 2010/0048382 A1 * | 2/2010 | Xie | B01J 29/405 |
| | | | 502/62 |
| 2011/0118107 A1 * | 5/2011 | Garcia-Martinez | B01J 29/04 |
| | | | 502/62 |
| 2012/0025134 A1 * | 2/2012 | Feng | B01D 53/62 |
| | | | 252/184 |

(Continued)

FOREIGN PATENT DOCUMENTS

| EP | 0938925 | 9/1999 |
| JP | H3-280827 | 12/1991 |

(Continued)

OTHER PUBLICATIONS

International Search Report PCT/GB2014/051947 dated Oct. 14, 2014.

(Continued)

Primary Examiner — Christopher P Jones
(74) Attorney, Agent, or Firm — Young & Thompson (57) ABSTRACT The present invention provides a water-resistant composition for adsorbing volatile organic compounds (VOCs) derived from organic matter including: a) palladium doped hydrogen-ZSM-5, wherein the Si:Al ratio of the hydrogen-ZSM-5 is less than or equal to 200:1; and b) at least one water-soluble binder. The invention also provides a method for using the water-resistant composition for adsorbing volatile organic compounds (VOCs) derived from organic matter.

25 Claims, 6 Drawing Sheets

(56) References Cited

U.S. PATENT DOCUMENTS

| | | | |
|---|---|---|---|
| 2012/0055334 A1* | 3/2012 | Ogata | B01D 53/323 95/135 |
| 2012/0160100 A1 | 6/2012 | Rowsell et al. | |
| 2013/0064720 A1* | 3/2013 | Sato | B01D 53/04 422/119 |
| 2014/0221702 A1* | 8/2014 | Weston | C07C 7/13 568/917 |

FOREIGN PATENT DOCUMENTS

| | | |
|---|---|---|
| KR | 20020035402 | 5/2002 |
| WO | 2007052074 | 5/2007 |
| WO | 2011001186 | 1/2011 |

OTHER PUBLICATIONS

"Database WPI Week 200377," Thomson Scientific, London GB AN 2003-825928.

* cited by examiner

WATER-RESISTANT COMPOSITION

This invention relates to a water-resistant composition suitable for the adsorption of volatile organic compounds (VOCs) derived from organic matter. More particularly, the organic matter can be perishable organic goods, such as food.

VOCs include a range of compounds which are derived from organic matter. One example of a VOC derived from organic matter is ethylene, a plant hormone which causes ripening, whilst another example is trimethylamine, a gas commonly given off by fish as it decomposes.

The removal of VOCs derived from organic matter is of interest for a variety of applications. The adsorption of ethylene can prevent undesired ripening and softening, loss of colour, loss of leaves and sprouting to occur in fruit and vegetables, it is also known to prevent other food and horticultural products from perishing prematurely, and can help eliminate unpleasant smells.

WO2007/052074 (to Johnson Matthey PLC) relates to the use of palladium doped hydrogen-ZSM-5 to adsorb VOCs derived from organic matter.

JP03-280827 (to Toray Industries Inc.) describes an ethylene-removing agent characterised as being formed as a result of an ion-exchange between some or substantially all of the exchangeable ions of an organic and/or inorganic ion exchanger with palladium ions and/or palladium complex ions. The ion-exchanger may be a zeolite which contains a metal oxide (such as $Na_2O$) as an essential component. JP03-280827 does not describe palladium doped hydrogen-ZSM-5 nor a water-resistant composition comprising at least one water-soluble binder.

In a first aspect, the present invention provides a water-resistant composition for adsorbing volatile organic compounds (VOCs) derived from organic matter comprising:
a) palladium doped hydrogen-ZSM-5, wherein the Si:Al ratio of the hydrogen-ZSM-5 is less than or equal to 200:1; and
b) at least one water-soluble binder.

By "water-resistant" we mean a composition which is able to substantially resist being dissolved by water or removed through the action of water under the conditions at which the composition is to be used. By "derived from" we mean the VOCs are released by the organic matter and are adsorbed by the water-resistant composition without the VOCs being combusted or oxidised before adsorption.

The water-resistant composition may be prepared by providing an aqueous formulation and substantially drying the aqueous formulation until the water-resistant composition forms. Accordingly, in another aspect, the present invention provides an aqueous formulation comprising:
a) palladium doped hydrogen-ZSM-5, wherein the Si:Al ratio of the hydrogen-ZSM-5 is less than or equal to 200:1;
b) at least one water-soluble binder; and
c) water.

The water-resistant composition and the aqueous formulation comprise palladium doped hydrogen-ZSM-5. The palladium itself can comprise from 0.1 wt % to 10.0 wt % based on the total weight of the doped hydrogen-ZSM-5, such as from 0.5 wt % to 5.0 wt % based on the total weight of the doped hydrogen-ZSM-5.

Hydrogen-ZSM-5 is a commercially available synthetic zeolite having a crystalline aluminosilicate structure. Hydrogen-ZSM-5 is prepared by a two-step method which firstly involves the formation of ZSM-5 containing a mixture of alkali metal cations, typically sodium (i.e. sodium-ZSM-5). The alkali metal form (e.g. the sodium form) is then ion-exchanged to provide hydrogen-ZSM-5. The present invention utilises hydrogen-ZSM-5, wherein the Si:Al ratio of the hydrogen-ZSM-5 is less than or equal to 200:1, for example less than or equal to 150:1, such as less than or equal to 100:1.

Methods of manufacturing palladium doped hydrogen-ZSM-5 are known to the skilled chemist, and include the use of a variety of palladium salts, such as $Pd(NO_3)_2$, $Pd(OAc)_2$, $PdCl_2$, palladium oxalate, tetraamine palladium hydrogen carbonate, tetraamine palladium hydroxide and tetraamine palladium acetate. The hydrogen-ZSM-5 may be calcined after impregnation with at least one palladium salt, however, for some applications this may not be necessary. Samples of palladium doped hydrogen-ZSM-5 which are calcined will comprise elemental palladium and/or at least partially oxidised palladium. In some embodiments, the palladium-doped hydrogen-ZSM-5 is calcined palladium-doped hydrogen-ZSM-5.

The binder acts as a carrier for the palladium doped hydrogen-ZSM-5 and allows it to adhere to a substrate. At least one water-soluble binder may be used (e.g. 1, 2, 3, 4 or 5 water-soluble binders). If more than one binder is used, each binder may of the same type or of a different type. Suitable binders will exhibit the following characteristics:
a) Solubility in water. In order to prepare the aqueous formulation, the binder will be substantially soluble in water or can be forced into solution and will thereafter remain in solution after removal of the forcing conditions. Forcing conditions include, for example, heating and/or high shear mixing.
b) Water-resistance of the dried composition. Water-based compositions will naturally have the tendency to be more susceptible to water/humidity than organic solvent based systems. As such, the long term effects of a humid environment on the composition will need to be taken into account. The present invention, however, balances the properties of the water-soluble binders in that the binders are substantially soluble in the water-based formulation and yet form substantially water-resistant compositions on drying.
c) Compatibility with the palladium doped hydrogen ZSM-5. The water-soluble binders will have no or substantially no adverse effects on the palladium doped hydrogen ZSM-5. Adverse effects may include undesirably reacting with the palladium doped hydrogen-ZSM-5 or inhibiting its VOC adsorption uptake abilities.

Depending on the intended use of the water-resistant composition, the water-resistant composition may also comprise one or more of the following characteristics:
d) Approval for use in the operational duty. The selection of a suitable binder will depend upon the intended use of the water-resistant composition. In certain embodiments, the water-soluble binders can be food grade binders. Binders which are food grade will be required when the water-resistant composition is for use with perishable organic goods such as foods.

In other embodiments, binders which are not food grade may be suitable when the water-resistant composition is for use with organic matter which is not suitable for consumption such as refuse.
e) The thermal stability of the dried composition at the temperature or temperatures at which the composition is to be used.
f) The storage stability of the water-resistant composition. The water-resistant composition will retain or exhibit no significant loss in activity on storage. In certain embodiments, the water-resistant composition exhibits substantially no loss in activity when stored at room temperature for at least 12 weeks.

In one embodiment, the water-soluble binder is a polyvinyl alcohol (PVA). PVAs are water-soluble polymers which may be manufactured by the hydrolysis (saponification) of polyvinyl acetate. PVAs are typically described in terms of their degree of hydrolysis (% hydrolysis) and their average molecular weight ($M_w$).

Without wishing to be bound by theory, the water-resistance of the dried PVA-containing compositions appears to increase with increasing $M_w$ and degree of hydrolysis. In some embodiments, however, the inventors have found that suitable PVAs having a lower $M_w$ and higher degree of hydrolysis, or a higher $M_w$ and lower degree of hydrolysis may also be used in the present invention. In some embodiments, the PVA has a % hydrolysis which is about ≥80%. In some embodiments, the % hydrolysis is about ≥85%. In some embodiments, the % hydrolysis is from about 86 to about 99+%. In some embodiments, the $M_w$, is from about 27,000 to about 205,000. In some embodiments, the $M_w$ is from about 80,000 to about 205,000. In one preferred embodiment, the $M_w$ is from about 85,000 to about 215,000. In one especially preferred embodiment, the $M_w$ is from about 145,000 to about 205,000. Examples of suitable PVAs include but are not limited to:

a) a PVA which has an $M_w$ ~205,000 and is 88% hydrolysed (e.g. Mowiol® 40-88 ($M_w$ ~205,000, 88% hydrolysed);
b) a PVA which has an $M_w$ ~85,000-146,000 and is 99+% hydrolysed (e.g. Aldrich® $M_w$ 85,000-146,000, 99+% hydrolysed);
c) a PVA which has an $M_w$ 89,000-98,000 and is 99+% hydrolysed (e.g. Aldrich® $M_w$ 89,000-98,000, 99+% hydrolysed);
d) a PVA which has an $M_w$ 130,000 and is 99+% hydrolysed;
e) a PVA which has an $M_w$ ~145,000 and is 99+% hydrolysed (e.g. Mowiol® 28-99 ($M_w$ ~145,000, 99+% hydrolysed));
f) a PVA which has an $M_w$ 146,000-186,000 and is 99+% hydrolysed;
g) a PVA which has an $M_w$ 27,000 and is 98% hydrolysed (e.g. Mowiol® 4-98 ($M_w$ 27,000, 98% hydrolysed));
h) a PVA which has an $M_w$ 195,000 and is 88% hydrolysed (e.g. Mowiol® 40-88 ($M_w$ 195,000, 88% hydrolysed));
i) a PVA which has an $M_w$ 205,000 and is 88% hydrolysed (e.g. Mowiol® 40-88 ($M_w$ 205,000, 88% hydrolysed));

In another embodiment, the water-soluble binder may be a gum. Examples of suitable gums include but are not limited to guar gum or gum arabic.

In yet another embodiment, the water-soluble binder may be a cellulose or derivative thereof. Suitable celluloses include but are not limited to 2-hydroxyethylcellulose or hypromellose (hydroxypropyl methylcellulose).

In yet another embodiment, the water-soluble binder may be a polyethylene oxide (PEO). In some embodiments, the PEO has a $M_w$ from about 100,000 to about 1,000,000. In one embodiment, the $M_w$ is about 100,000. In another embodiment, the $M_w$ is about 1,000,000.

The water-resistant composition may further comprise one or more other components, such as one or more binder modifiers, driers, plasticisers, fillers, surfactants, pigments or preservatives. The or each component may be added in any suitable quantity. In one embodiment, the water-resistant composition further comprises one or more binder modifiers. An example of a suitable binder modifier is polytetrafluoroethylene (PTFE). Without wishing to be bound by theory, it is believed that PTFE increases the hydrophobicity and flexibility of the water-resistant composition. In certain embodiments, the aqueous formulation may comprise PTFE from about 0.01 to about 10 wt % concentration of the aqueous formulation, such as from about 0.1 to about 7.5 wt % concentration, for example, from about 0.25 to about 5 wt % concentration. The % dry weight of the PTFE in the water-resistant composition can be calculated by known methods depending on the concentration of the aqueous formulation.

The aqueous formulation may be prepared by any suitable method. In one preferred method, the at least one binder is dissolved in a suitable volume of water with heating (if required) and/or stirring (if required) to form an aqueous solution. The solution is then mixed with the palladium doped hydrogen-ZSM-5 and, if used, one or more binder modifiers, driers, plasticisers, fillers, surfactants, pigments or preservatives.

Alternatively, a suitable volume of water may be added to an admix comprising the palladium doped hydrogen-ZSM-5, one or more one water-soluble binders and, optionally, one or more binder modifiers, driers, plasticisers, fillers, surfactants, pigments or preservatives with heating (if required) and/or stirring (if required) to form an aqueous solution.

In another aspect, therefore, the present invention provides an admix comprising:
(a) palladium doped hydrogen-ZSM-5, wherein the Si:Al ratio of the hydrogen-ZSM-5 is less than or equal to 200:1;
b) at least one water-soluble binder (e.g. 1, 2, 3, 4 or 5 water-soluble binders); and
c) optionally, at least one (e.g. 1, 2, 3, 4 or 5) binder modifiers, driers, plasticisers, fillers, surfactants, pigments or preservatives.

An admix conveniently allows the storage and transportation of the components prior to the preparation of the aqueous formulation.

In one embodiment, the aqueous formulation may be deposited shortly after being prepared. In another embodiment, the aqueous formulation may be stored for use at a later time. In the latter instance, it is preferable that on deposition and drying the water-resistant composition shows little or no deactivation in its ability to adsorb VOCs.

The aqueous formulation may be deposited by any suitable method which forms a film or coating such as printing (e.g. using a k-bar), casting, roller application, brushing, spraying or like techniques. The mode by which the aqueous formulation is to be applied may influence the desired viscosity of the formulation. For example, a formulation suitable for spraying may need to be less viscous than one which is required for roller application. The viscosity of the formulation will be generally influenced by the type of binder, as well as the amount of binder in the formulation. In one embodiment, the aqueous formulation may comprise the binder from about 0.1 to about 10 wt % concentration of the aqueous formulation, such as from about 0.5 to about 7.5 wt % concentration, for example, from about 1 to about 5 wt % concentration. The % dry weight of the binder can be calculated by known methods depending on the concentration of the aqueous formulation.

Howsoever the aqueous formulation is deposited, the formulation is then substantially dried to provide the water-resistant composition. The formulation may be dried at any suitable temperature. In one preferred embodiment, the formulation is dried at one or more temperatures in the range of about 10° C. to about 100° C., for example, from about 15° C. to about 80° C., such as about 20° C. to about 75° C.

It is preferred that the temperature is maintained below the decomposition temperature of any component in the formulation and so when a component is known to decompose within the temperature ranges given above, the temperature should be maintained below the decomposition temperature. Alternatively or in addition, alternative suitable drying methods may be used, such as drying using a UV lamp.

Howsoever the drying process is conducted, it may be carried out for a period of time from about 1 second to about 24 hours. Usually the formulation has dried within about 18 hours or less. In certain embodiments, the formulation may be dried within about 2 hours. In other embodiments, the formulation may be dried within about 30 minutes.

In another aspect, the present invention provides an article comprising:
packaging or a container configured to hold organic matter; and
a water-resistant composition comprising:
   a) palladium doped hydrogen-ZSM-5, wherein the Si:Al ratio of the hydrogen-ZSM-5 is less than or equal to 200:1; and
   b) at least one water-soluble binder.

The water-resistant composition, palladium doped hydrogen-ZSM-5 and at least one water-soluble binder are as described above.

The organic matter from which the VOCs are derived may be contained within a storage container or package, such that the water-resistant composition has a closed or semi-enclosed environment within which to adsorb the VOCs. In the case of perishable organic goods, the storage container or package is likely to be the container or package within which the goods are contained, e.g. crates used to store the goods when in transit or the packaging within which the goods are kept when on display prior to purchase. In another embodiment, the water-resistant composition is incorporated into, or into part of, the storage container or package itself.

In yet another aspect, the invention provides an article comprising:
a water-resistant composition comprising:
   a) palladium doped hydrogen-ZSM-5, wherein the Si:Al ratio of the hydrogen-ZSM-5 is less than or equal to 200:1; and
   b) at least one water-soluble binder,
and further wherein the article is a label or sheet.

The water-resistant composition, palladium doped hydrogen-ZSM-5 and at least one water-soluble binder are as described above.

The water-resistant composition may be incorporated onto or into a label or sheet. The label or sheet may comprise a substrate which may be suitable for insertion and retention within a storage container or package. In addition to labels to be packaged inside packaging, the invention includes adhesive labels, decals and the like. In one embodiment, the aqueous formulation may be deposited onto or into a woven or non-woven synthetic fabric. In a preferred embodiment, the substrate is Tyvek®, (i.e. a non-woven substrate of polyethylene fibers).

In one embodiment, the water-resistant composition may be used in an open environment, for example, on open shelves under a loose display of organic produce. In this instance, the water-resistant composition may comprise any suitable format, such as the labels and sheets described above.

In yet another aspect, the present invention provides the use of a water-resistant composition as described above for adsorbing VOCs derived from organic matter.

The organic matter can be perishable organic goods, such as items of food and horticultural produce. The items of food may comprise fruit and/or vegetables. The horticultural produce may comprise plants and/or cut flowers.

Alternatively, the organic matter may comprise refuse. Such refuse may include kitchen refuse such as waste food, which produces unpleasant odours whilst decomposing.

If the perishable organic goods comprise items of food, the water-resistant composition may be packaged in a way to prevent direct contact with the food, e.g. behind a gas permeable barrier layer. The gas permeable barrier layer may be affixed on top of the composition itself or may form part of label incorporating the composition.

If, however, the source of VOCs is refuse, the storage container or package may be a refuse receptacle.

Controlled atmosphere storage of fresh produce utilizes high levels of $CO_2$ and reduced oxygen to increase the shelf life of the product. Modified atmosphere packaging is used to enhance the lifetime and/or the quality of food by reducing the amount of oxygen (towards zero) in the atmosphere compared to air. Fresh produce tends to be packed under an equilibrium modified atmosphere which uses high levels of $CO_2$ and reduced levels of oxygen and which allows a reduced respiration rate. The water-resistant composition may be conveniently used in a controlled atmosphere or modified atmosphere environment. In one embodiment, the water-resistant composition may be used in an environment comprising less than 10 vol % of oxygen. In another embodiment, the level of oxygen in these environments is present in a range between ≥0.5 vol % and <10 vol %. For example, the level of oxygen may be about 1 vol %, about 2 vol %, about 3 vol %, about 4 vol %, about 5 vol %, about 6 vol %, about 7 vol %, about 8 vol % or about 9 vol %. In another embodiment, the level of oxygen is substantially 0 vol %. The balance of the gas composition may comprise an inert gas (such as nitrogen), optionally carbon dioxide and/or optionally carbon monoxide.

Other methods of using the present invention may be used in appropriate circumstances.

One advantage associated with this invention is that the VOCs can be adsorbed at relatively low temperatures, such as in the range of from −10° C. to 50° C., more commonly from 0° C. to 40° C. For example, the temperature range may be from about 0° C. to about 35° C. or about 0° C. to about 30° C. This enables the water-resistant composition to be used in the environment within which the organic matter is commonly found, e.g. refrigerators or at ambient temperature, without requiring complex heating and gas recirculation equipment to be used. Nonetheless, where a particular application allows for heating and gas recirculation equipment to be used (e.g. a gas conditioning system) the water-resistant composition may also be operated at an elevated temperature, e.g. above 60° C.

In one embodiment, the VOCs comprise ethylene. Ethylene is a gaseous hormone released by plants that can cause plants to wilt and fruits to ripen. The removal of VOCs produced by plants can delay these processes enabling food and horticultural produce to be kept in transit and/or in storage for longer without accelerating perishing. Therefore, a particular application of this invention is to industries that produce, ship, export and buy food and horticultural produce. Tests have shown that, unlike prior art methods, the use of an adsorber according to this invention enables the shelf life of post-climacteric fruit to be extended (see for example Terry L, Ilkenhans T, Poulston S, Rowsell E and Smith A W J, *Postharvest Biology and Technology* 45 (2007) 214-220). That is, even after the climacteric respiratory rise has been initiated, fruit is prevented from ripening further (or at least the rate of ripening slowed) using palladium doped hydrogen-ZSM-5 to adsorb ethylene.

The VOCs may be odorous, for example, sulfur-containing VOCs (such as hydrogen sulfide), nitrogen-containing VOCs (such as ammonia or triethylamine) or oxygen-containing VOCs. In one embodiment, the oxygen-containing VOCs comprise formaldehyde and/or acetic acid. Formaldehyde and acetic acid are malodorous chemicals that are often found in the home. Formaldehyde may be released from pressed bonded wood products, such as plywood, but is also found in dyes, textiles, plastics, paper products, fertilizer, and cosmetics. Acetic acid may be released from kitchen waste and animal waste. Therefore, one potential application of this invention is to the removal of malodours from the domestic environment.

At least a proportion of the adsorbed VOCs may be converted into secondary compounds after adsorption onto the palladium doped hydrogen-ZSM-5.

In one embodiment, the water-resistant composition is effective to adsorb the VOCs to a level of less than or equal to 0.10 ppm, for example to a level of less than or equal to 0.05 ppm. In another embodiment, the water-resistant composition is effective to adsorb substantially all of the VOCs i.e. no detectable amount of the VOCs remains.

The water-resistant composition may be used continuously for VOC removal for an extended period of time, e.g. several days, (the actual time depending upon the environment within which it is used). In certain embodiments, the water-resistant composition may be subjected to water immersion for a period of time (for example, at least five minutes) without the dried water-soluble binder softening. Moreover, there is no significant loss in activity of the palladium doped hydrogen-ZSM-5 after it has been exposed to water. As food and horticultural produce are usually stored in humid environments, these features are also beneficial to the relevant industries.

In order to identify the time when the water-resistant composition has reached its VOC adsorption capacity, a VOC indicator may be included for use with the water-resistant composition. Suitable indicators include the palladium based ethylene indicator disclosed in patent application JP 60-201252.

In order that the invention may be more fully understood the following non-limiting Examples are provided by way of illustration only and with reference to the accompanying figures in which.

EXAMPLES

Example 1

Preparation of Doped Supports

The palladium doped hydrogen-ZSM-5 was prepared using the incipient wetness impregnation method. Typically 20 g of the hydrogen-ZSM-5 was impregnated with a nitrate salt or chloride salt of palladium, and then dried at 110° C. before being calcined in air at 500° C. for 2 hrs to form the palladium doped hydrogen-ZSM-5.

Example 2

Ethylene Adsorption Capacity Experiments

The ethylene adsorption capacity of palladium doped hydrogen-ZSM-5 was compared against palladium doped sodium-ZSM-5.

| | Ethylene Adsorption [c] |
|---|---|
| 2.5 wt % Pd/Na-ZSM-5 [a] (comparative) | 282 μl/g |
| 2.5 wt % Pd/H-ZSM-5 [b] | 4162 μl/g |

[a] 2.5 wt % palladium doped sodium-ZSM-5 was prepared using the incipient wetness impregnation method. Thus, 5 g of sodium-ZSM-5 was impregnated with palladium nitrate solution, dried at 105° C. and calcined at 500° C. for 2 hours.
[b] 2.5 wt % palladium doped hydrogen-ZSM-5 was prepared using the incipient wetness impregnation method. Thus, 5 g of hydrogen-ZSM-5 was impregnated with palladium nitrate solution, dried at 105° C. and calcined at 500° C. for 2 hours.
[c] the ethylene adsorption capacity was tested as follows: measurements were carried out in a plug flow reactor at 21° C. with 0.1 g doped support of particle size 250-355 μm with a flow rate of 50 ml/min of gas comprising 10% $O_2$, 200 ppm $C_2H_4$, ~1% water (where present) and balance He/Ar.

As can be seen from the data provided above, the ethylene adsorption capacity for palladium doped hydrogen-ZSM-5 is 4162 μl/g as compared to 282 μl/g for the palladium doped sodium-ZSM-5 i.e. the palladium doped hydrogen-ZSM-5 has an ethylene adsorption capacity nearly fifteen times greater than palladium doped sodium-ZSM-5.

Example 3

Preparation of Water-Resistant Compositions

Aqueous stock solutions of polymer binders were prepared by dissolving the polymer in water and stirring with heating until the polymer had completely dissolved. For polyvinyl alcohol (PVA) based compositions this required >90° C. for a completely clear solution. All solutions were prepared at 4.3 wt. % concentration, unless otherwise stated.

The polymer solution (18 g of 4.3 wt. % polymer) was weighed out and mixed with palladium doped hydrogen-ZSM-5 (20 g). Mixing was achieved with a Speed Mixer® set at 3000 rpm for 30 sec. This equated to a dry weight composition of 4.3% polymer and 95.7% palladium doped hydrogen-ZSM-5 powder. If the viscosity was too high, a 2.5% solution was prepared (equivalent to 2.15% dry weight).

Ethylene Removal Tests

The formulations were printed onto Tyvek® paper using a 25 μm k-bar. Samples were left to dry in air overnight and then stored in sealed plastic bags for ethylene removal testing. The ethylene removal experiments were carried out at room temperature in an unstirred batch reactor (0.86 L) with a 3×3 inch (7.62×7.62 cm) printed sheet and an initial gas composition of 550 μL $L^{-1}$ (i.e. 550 ppm) ethylene, 40% (v/v) air balanced with Ar. Selected gas concentrations were measured at hourly intervals with a Varian CP-4900 Micro GC (Varian Inc., CA). Gas samples (40 ms duration) were taken via an automated recirculating sampling system. Column and injector temperatures were set at 60 and 70° C., respectively. The 0.15 mm diameter, 10 m long column was packed with PoraPLOT Q. Ethylene and $CO_2$ were calibrated against 10 μL $L^{-1}$ ethylene balanced with air and 5%

(v/v) $CO_2$ balanced with Ar (Air Products Europe, Surrey, UK). A thermal conductivity detector was used with He carrier gas at 276 kPa inlet pressure. Peak integration was carried out within the Varian STAR software.

A graph of ethylene removal rate against time was plotted to assess the quality of the coating. Water resistance and adhesion was also checked by spraying water onto the surface and by folding the Tyvek® to look for flaking or cracking. Samples were only tested for ethylene uptake if the adhesion was considered acceptable. In the tables, the term "good adhesion" means the coating did not fall off when rubbed or folded once. "Good water resistance" means the coating did not fall off when sprayed with a jet of water.

Example 4

PVA Compositions

PVA compositions were prepared and tested as described in Example 3.

TABLE 1

PVA compositions

| Sample | Polymer | Dry Coating adhesion | Coating resistance to water jet |
|---|---|---|---|
| PVA-1 | $M_w$ ~205k (Mowiol ® 40-88), 88% hydrolysed | Good | Good |
| PVA-2 | $M_w$ 85-146k, 99+% hydrolysed, Aldrich | Good | Good |
| PVA-3 | $M_w$ 89-98k 99+% hydrolysed, Aldrich | Good | Good |
| PVA-4 | $M_w$ 130k 99+% hydrolysed | Good | Good |
| PVA-5 | $M_w$ 145k (Mowiol ® 28-99) 99+% hydrolysed | Good | Good |
| PVA-6 | $M_w$ 146-186k, 99+% hydrolysed | Good | Good |
| PVA-7 (comparative) | 4.3% stock solution (PVA (75%)-PEG (25%) | Poor | All removed |
| PVA-8 (comparative) | 2.5% stock solution PVA (75%)-PEG (25%) | Poor | All removed |
| PVA-9 (comparative) | 4.3% MOWIOL ® PVA 4-88 $M_w$ 31k 88% hydrolysed | Good | Poor |
| PVA-10 | 4.3% MOWIOL ® PVA 4-98 $M_w$ 27k 98% hydrolysed | Good | Good |
| PVA-11 | 4.3% MOWIOL ® PVA 40-88 $M_w$ 195k 88% hydrolysed | Good | Good |
| PVA-12 | 4.3% MOWIOL ® PVA 40-88 $M_w$ 205k 88% hydrolysed | Good | Good |
| PVA-13 | 4.3% PVA ($M_w$146-186)/PFTE (0.5%) | Good | Good |
| PVA-14 | 4.3% PVA ($M_w$146-186)/PFTE (1%) | Good | Good |
| PVA-15 | 4.3% PVA ($M_w$146-186)/PFTE (4.3%) | Good | Good |

Figure 1:
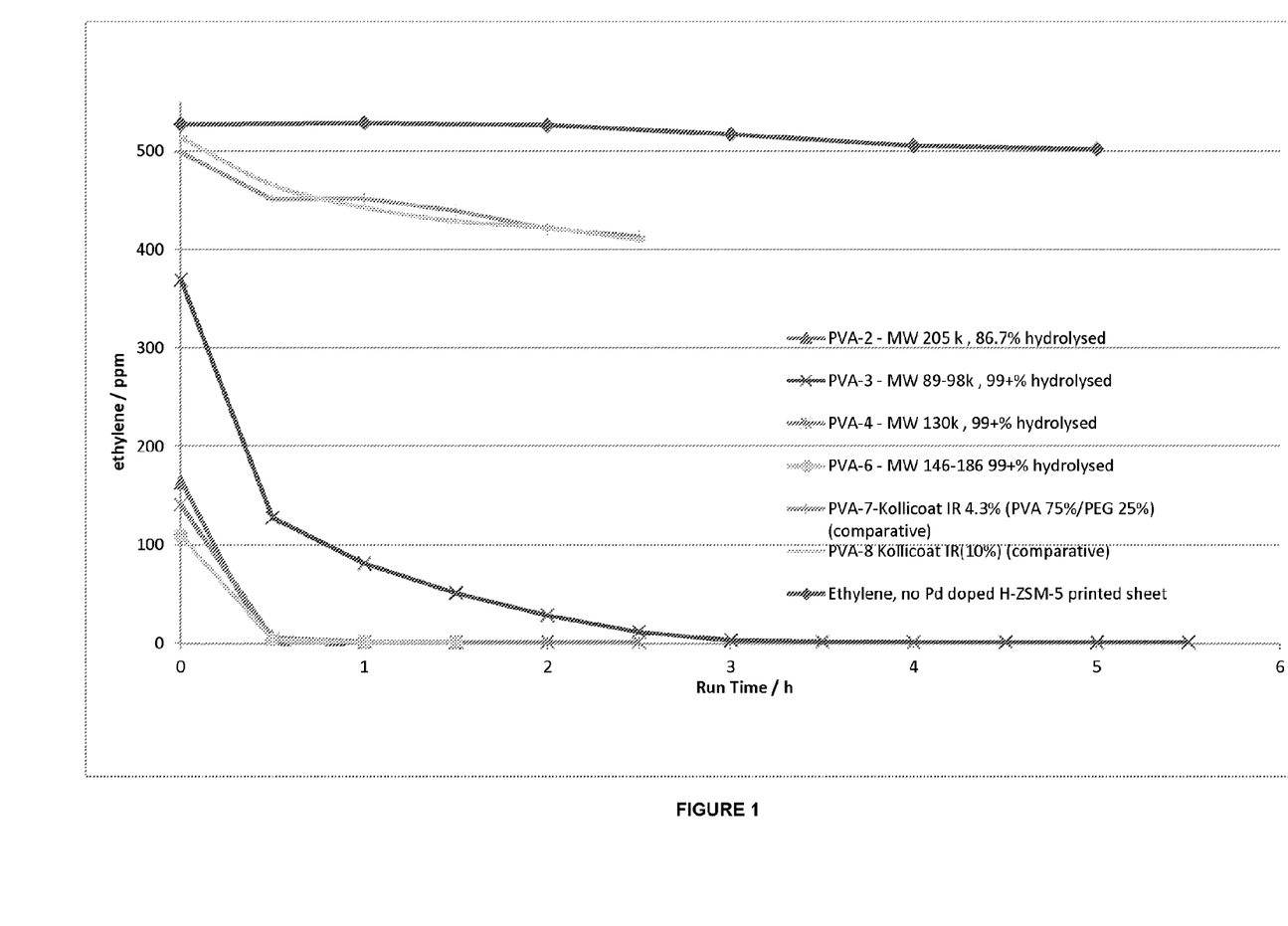
FIGS. 1 and 2 illustrate the ethylene removal abilities of PVA compositions comprising palladium doped hydrogen-ZSM-5.
Figure 2:
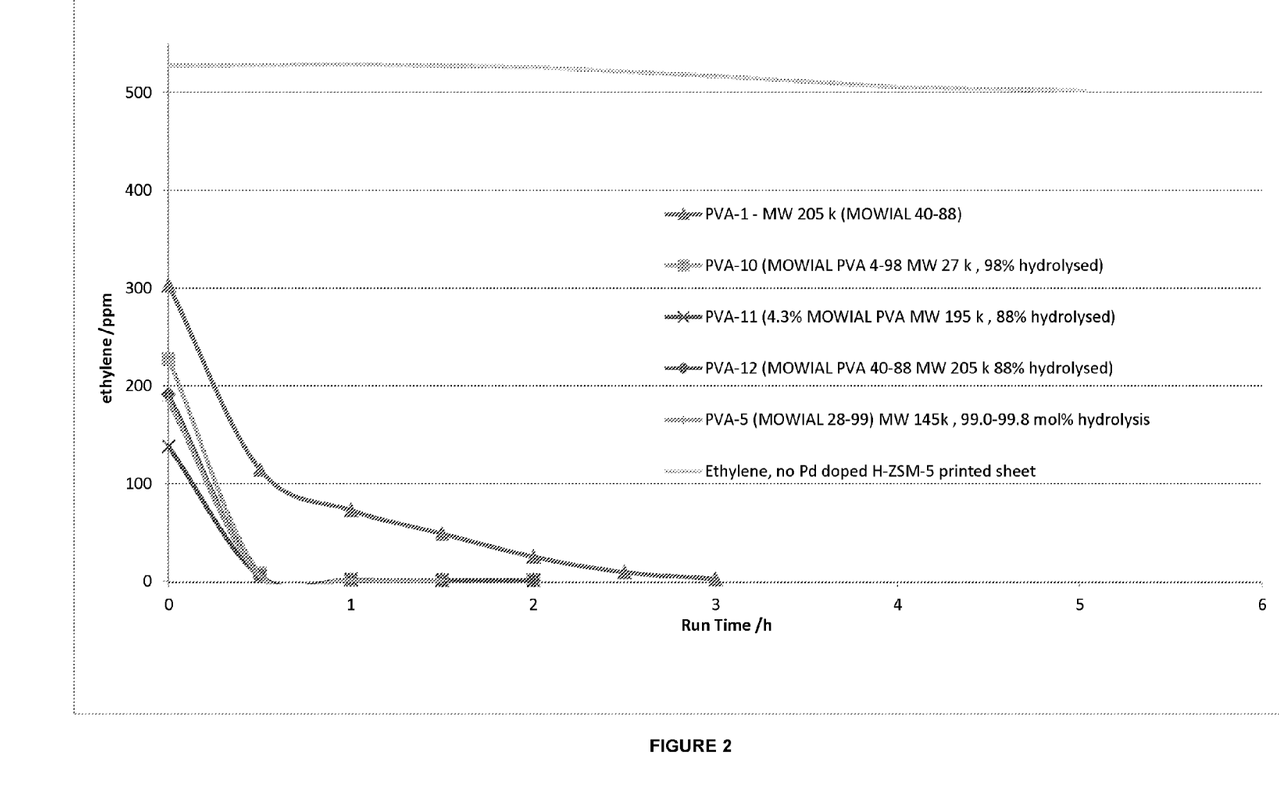

FIG. 1 illustrates that PVA-7 and PVA-8 exhibited no significant ethylene adsorption capacity. The other PVA samples tested, however, demonstrated efficient ethylene removal (see FIGS. 1 and 2).

Without wishing to be bound by theory, it appears that the PVAs which exhibited good dry coat adhesion and water-resistance are those which have a higher % hydrolysis and/or $M_W$. While low $M_W$ and low % hydrolysis PVAs may provide flexible/softer coatings, the PVAs tested in this instance do not appear to be sufficiently water-resistant after drying.

Samples made directly from PTFE solutions showed poor adhesion to Tyvek® and so were not tested further in ethylene uptake experiments. It was found, however, that small amounts of PTFE added to PVA formulations did not significantly affect the rate of ethylene removal (see FIG. 3).

Figure 3:
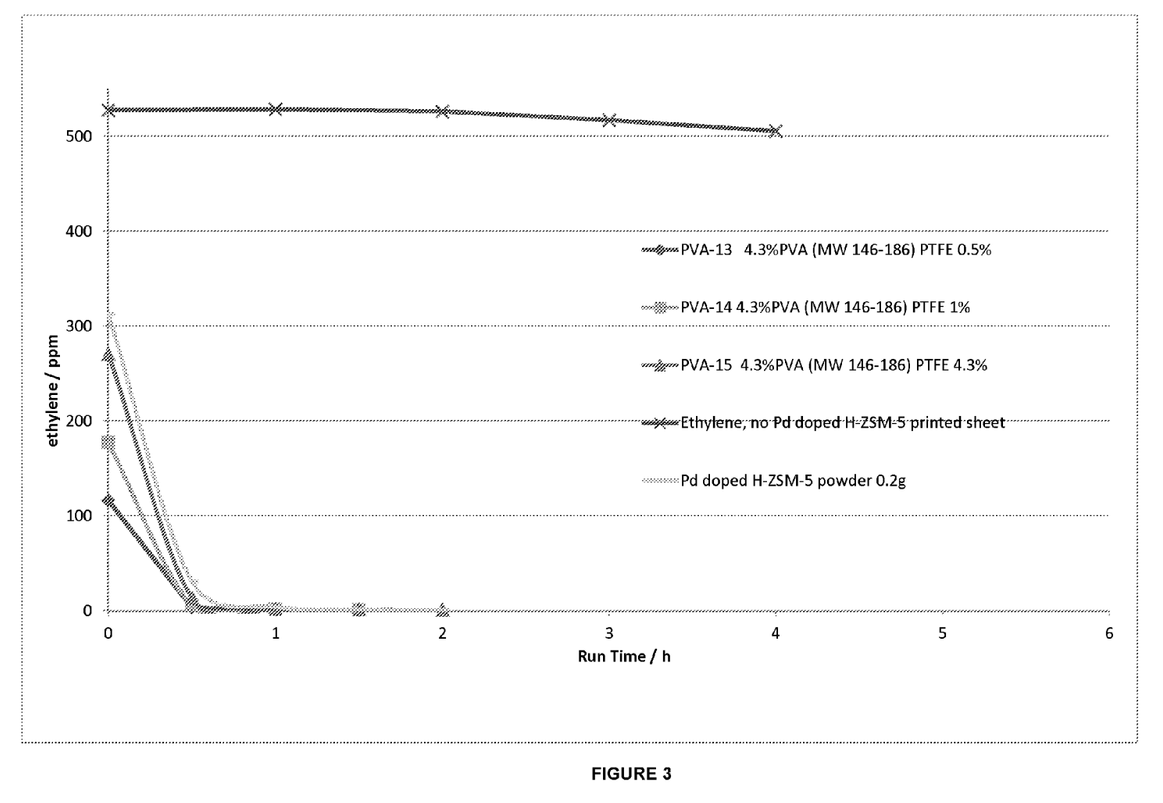
FIG. 3 shows the ethylene removal abilities of PVA/PTFE compositions comprising palladium doped hydrogen-ZSM-5.

The high molecular weight PVA may cause some cracking when prepared into a coating and then folded or creased. PVA-15 (which comprises PTFE) appears to be more flexible than PVA-13 or PVA-14 and therefore does not crack when creased in the same way. Without wishing to be bound by theory, it is possible that the hydrophobic PTFE acts as a binder modifier to introduce greater flexibility to the coating.

Example 5

Gums and Cellulosic Compositions

Gums and cellulosic compositions were prepared and tested as described in Example 3.

TABLE 2

Gums and Cellulosic Compositions

| Sample | Polymer | Dry coat adhesion | Coating resistance to water jet |
|---|---|---|---|
| A | 1% Guar gum stock | Good, some dusting | Good |
| B | Gum arabic (5%) | Good | Good |
| C | 2-Hydroxyethylcellulose | Good | Good |
| D | 2.5% hypromellose, highly viscous | Acceptable adhesion | Good |

Figure 4:
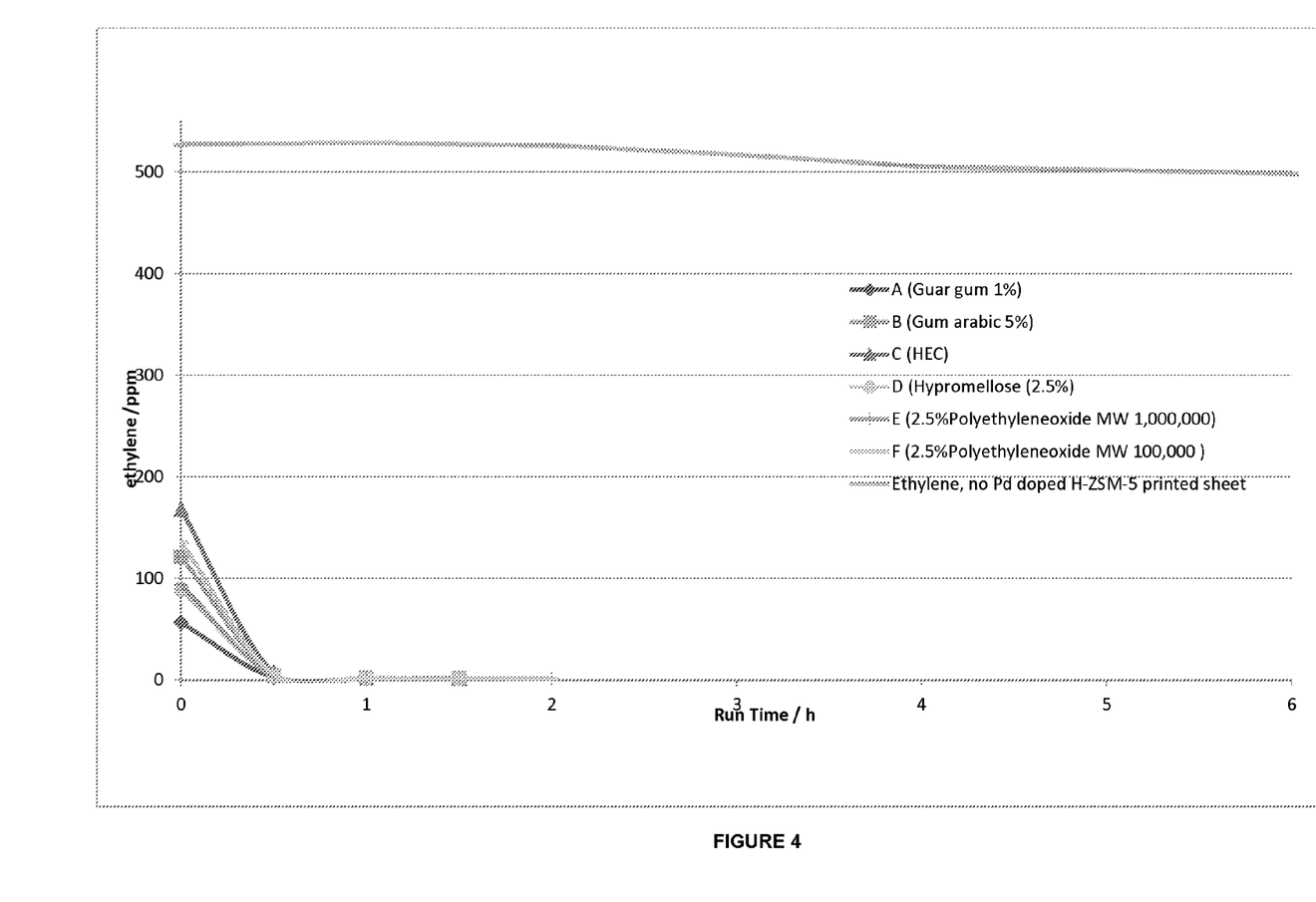
FIG. 4 illustrates the ethylene removal abilities of various gums and cellulosic compositions comprising palladium doped hydrogen-ZSM-5.

FIG. 4 shows that the both the gums and cellulosic compositions A-D performed well in adsorbing ethylene.

Example 6

Polyethylene Oxide Compositions

Polyethylene oxide compositions were prepared and tested as described in Example 3.

TABLE 3

Polyethylene Oxides

| Sample | Polymer | Dry coat adhesion | Coating resistance to water jet |
|---|---|---|---|
| E | 2.5% Polyethylene oxide (PEO) $M_w$ 1,000,000 | Good | Acceptable |
| F | 2.5% Polyethylene oxide (PEO) $M_w$ 100,000 | Good | Good |

FIG. 4 illustrates that the polyethylene oxide compositions E and F performed well in adsorbing ethylene.

Example 7

Variation in Drying Temperatures and Times

A variety of coatings were subjected to different drying temperatures and times. The experimental conditions described in Example 3 were otherwise unchanged.

TABLE 4 variation in drying temperatures and times

| Sample | Polymer | Drying temperature | Time/hour |
|---|---|---|---|
| PVA-6 | $M_w$ 146-186 99+% hydrolysed | 70° C. | 2 hours |
| PVA-16 | 4.3% PVA ($M_w$146-186)/PFTE (4.3%) | 40° C. | 30 mins |
| PVA-16 | 4.3% PVA ($M_w$146-186)/PFTE (4.3%) | 40° C. | 2 hours |
| C | 2-Hydroxyethylcellulose | 70° C. | 2 hours |

Figure 5:
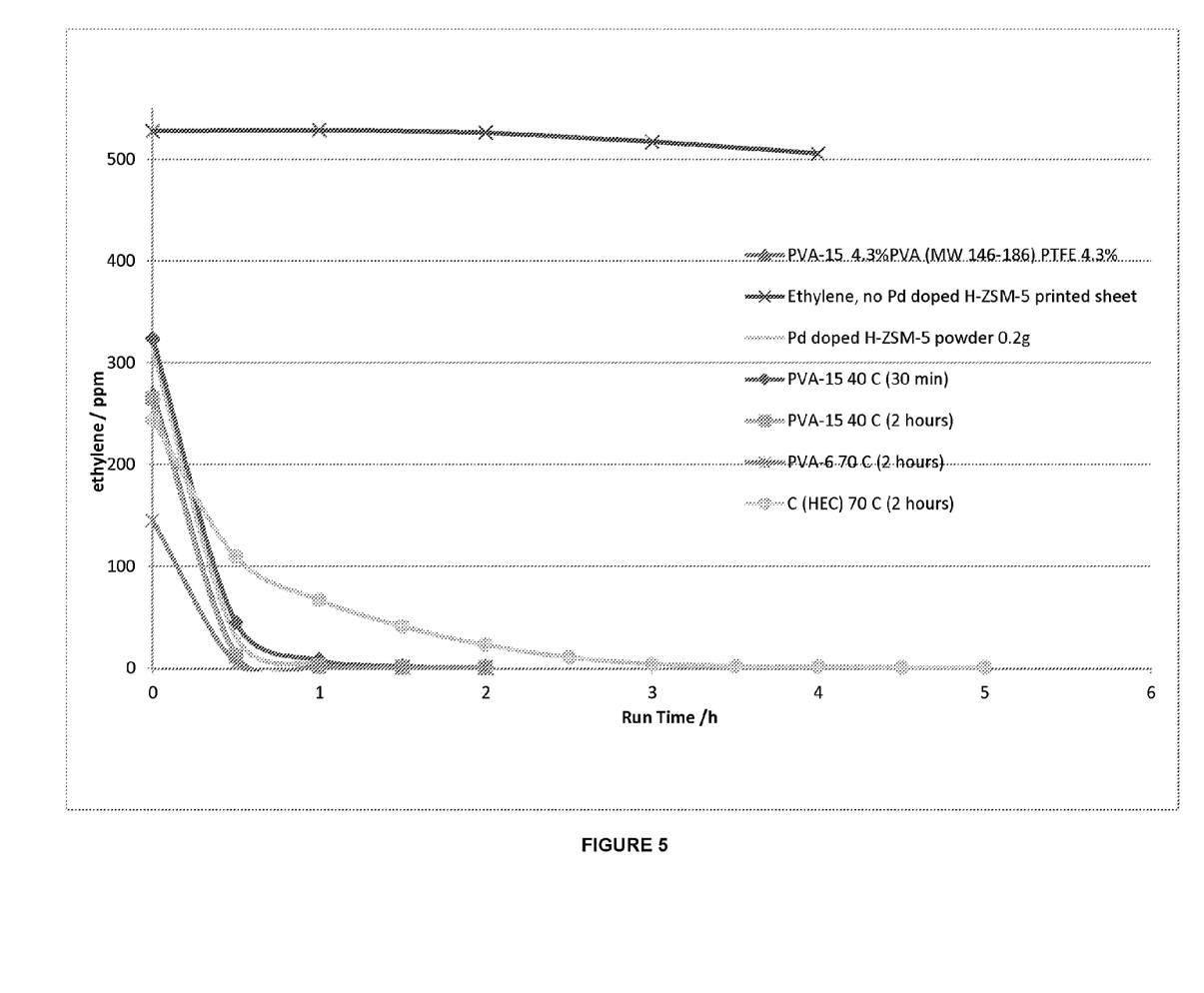
FIG. 5 shows the ethylene removal abilities of various compositions comprising palladium doped hydrogen-ZSM-5 which were subjected to different drying temperatures and times.

FIG. 5 shows that coatings made from PVA ($M_W$ 146-186, 99+% hydrolysed) or PVA/PTFE survive heating at 40° C. and 70° C. This suggests that drying is not an issue for these formulations. Sample C (2hydroxyethylcellulose) also performed well after drying a sheet at 70° C. for 2 hours.

Example 8

Sheet Ageing

Figure 6:
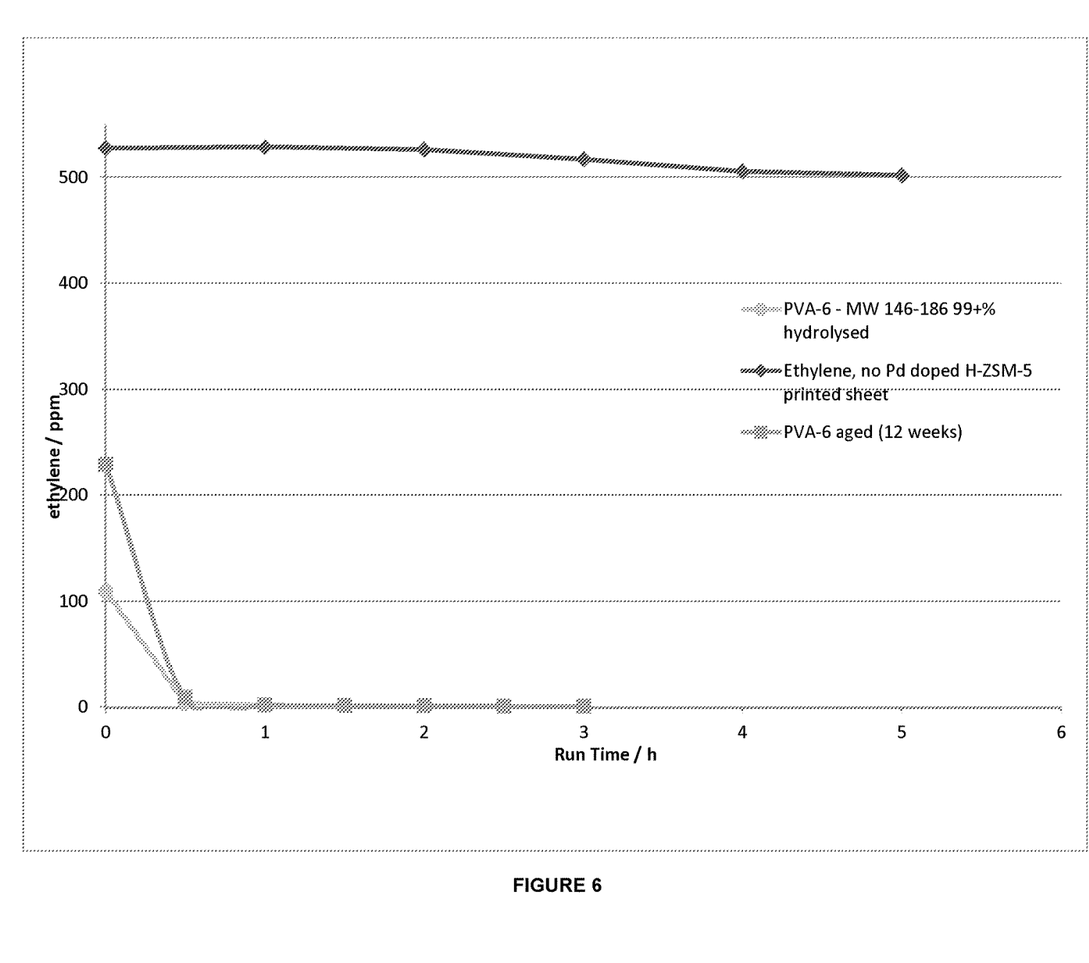
FIG. 6 illustrates the ethylene removal ability of a fresh and aged sample of PVA-6.

PVA coating PVA-6 was retested after 12 weeks storage (at room temperature in a sealed plastic bag) to assess whether there was any deactivation with storage time. FIG. 6 illustrates no significant deactivation occurred over 12 weeks at room temperature for this sample.

Example 9

Submersion in Water

Sample coatings which had passed the water spray test and showed good ethylene uptake rates were also tested for longer term water resistance. A square ~2 cm×2 cm was cut out from the print and submerged in water. The samples were checked after 5 min, 2 hours and 12 hours for adhesion and softening.

TABLE 5 submersion in water for 5 minutes

| Sample | 5 mins in water |
|---|---|
| PVA-1 | Coating intact |
| PVA-2 | Coating intact |
| PVA-3 | Coating intact |

TABLE 5-continued submersion in water for 5 minutes

| Sample | 5 mins in water |
|---|---|
| PVA-4 | Coating intact |
| PVA-5 | Coating intact |
| PVA-6 | Coating intact |
| PVA-10 | Coating intact |
| PVA-11 | Coating intact |
| PVA-12 | Coating intact |
| A | Coating intact |
| B | Coating intact |
| C | Coating intact |
| D | Coating intact |
| E | Coating intact |
| F | Coating intact |

TABLE 6 submersion in water for 2 hours

| Sample | 2 hours in water |
|---|---|
| PVA-1 | Coating intact |
| PVA-2 | Coating intact |
| PVA-3 | Coating intact |
| PVA-4 | Coating intact |
| PVA-6 | Coating intact |
| PVA-11 | Coating intact |
| PVA-12 | Coating intact |
| C | Coating intact |
| E | Coating intact |

TABLE 7 submersion in water for 12 hours

| Sample | 12 hours in water |
|---|---|
| PVA-4 | Coating intact |
| PVA-6 | Coating intact |
| C | Coating intact |

From these experiments it was found that a variety of polymer binders survived 5 minutes, 2 hours or 12 hours in water.

Example 10

Submersion in Water

Samples PVA-2, PVA-4, PVA-5 and PVA-6 (which had been prepared according to Example 3) were redried at 40° C. for 3 hours and subjected to the water immersion test as described in Example 9. This was done to ensure that the PVA had adhered completely to the Tyvek® and to assess whether this improved the adhesion.

TABLE 8

Results of submerging PVA coated (40° C.) sample in water for up to 12 hours

| Sample | 5 min in water | 2 h in water | 12 h in water |
|---|---|---|---|
| PVA-2 (40° C.) | Coating intact | Coating intact | Coating intact; removed only by hard rubbing |
| PVA-4 (40° C.) | Coating intact | Coating intact | Coating intact; removed only by hard rubbing |
| PVA-5 (40° C.) | Coating intact | Coating intact | Coating intact; removed only by hard rubbing |

TABLE 8-continued

Results of submerging PVA coated (40° C.) sample in water for up to 12 hours

| Sample | 5 min in water | 2 h in water | 12 h in water |
|---|---|---|---|
| PVA-6 (40° C.) | Coating intact | Coating intact | Coating intact; removed only by hard rubbing |

Table 8 shows a trend of improved water-resistance for the PVA samples with higher $M_W$. This was most noticeable after 12 hours submergence in water. The higher $M_W$ PVA samples could only removed by firm rubbing of the coating.

The invention claimed is:

1. A water-resistant composition for adsorbing volatile organic compounds (VOCs) derived from organic matter comprising:
   a) palladium doped hydrogen-ZSM-5, wherein the Si:Al ratio of the hydrogen-ZSM-5 is less than or equal to 200:1; and
   b) at least one water-soluble binder, wherein the water-soluble binder is selected from the group consisting of: at least one polyvinyl alcohol having a $M_w$ from 27,000 to 215,000 and a degree of hydrolysis ≥80%; guar gum; gum arabic; 2-hydroxyethylcellulose; hydroxypropyl methylcellulose; and polyethylene oxide having a $M_w$ from 100,000 to 1,000,000.

2. A water-resistant composition according to claim 1, wherein the Si:Al ratio of the hydrogen-ZSM-5 is less than or equal to 100:1.

3. A water-resistant composition according to claim 1, further comprising one or more binder modifiers, driers, plasticisers, fillers, surfactants, pigments or preservatives.

4. A method for adsorbing volatile organic compounds (VOCs) derived from organic matter, comprising applying a water-resistant compound to the volatile organic compounds, wherein the water-resistant composition comprises:
   a) palladium doped hydrogen-ZSM-5, wherein the Si:Al ratio of the hydrogen-ZSM-5 is less than or equal to 200:1; and
   b) at least one water-soluble binder, wherein the water-soluble binder is selected from the group consisting of: at least one polyvinyl alcohol having a $M_w$ from 27,000 to 215,000 and a degree of hydrolysis ≥80%; guar gum; gum arabic; 2-hydroxyethylcellulose; hydroxypropyl methylcellulose; and polyethylene oxide having a $M_w$ from 100,000 to 1,000,000.

5. The method according to claim 4, wherein the Si:Al ratio of the hydrogen-ZSM-5 is less than or equal to 100:1.

6. The method according to claim 4, the water-resistant composition further comprising one or more binder modifiers, driers, plasticisers, fillers, surfactants, pigments, or preservatives.

7. The method according to claim 4, wherein the organic matter consists of perishable organic goods.

8. The method according to claim 7, wherein the perishable organic goods comprise items of food or horticultural produce.

9. The method according to claim 8, wherein the items of food comprise fruit and/or vegetables.

10. The method according to claim 8, wherein the horticultural produce comprises plants and/or cut flowers.

11. The method according to claim 4, wherein the organic matter comprises refuse.

12. The method according to claim 4, wherein the organic matter is contained in a storage container or package.

13. The method according to claim 12, wherein the water-resistant composition is incorporated into, or into part of, the storage container or package.

14. The method according to claim 4, wherein the water-resistant composition is incorporated into a label comprising a substrate.

15. The method according to claim 12, wherein the storage container or package is a refuse receptacle.

16. The method according to claim 4, wherein the VOCs are adsorbed at a temperature of from −10° C. to 50° C.

17. The method according to claim 4, wherein the VOCs are selected from the group consisting of ethylene, formaldehyde and acetic acid.

18. The method according to claim 4, wherein the water-resistant composition is used in an environment comprising less than 10 vol % of oxygen.

19. The method according to claim 18, wherein the environment is a controlled atmosphere or modified atmosphere environment.

20. The method according to claim 18, wherein the oxygen is present in the range between >0.5 vol % and <10 vol %.

21. The method according to claim 4, wherein the VOCs are adsorbed to a level of less than or equal to 0.10 ppm.

22. An article comprising:
   packaging or a container configured to hold organic matter; and
   a water-resistant composition comprising:
   a) palladium doped hydrogen-ZSM-5, wherein the Si:Al ratio of the hydrogen-ZSM-5 is less than or equal to 200:1; and
   b) at least one water-soluble binder, wherein the water-soluble binder is selected from the group consisting of: at least one polyvinyl alcohol having a $M_w$ from 27,000 to 215,000 and a degree of hydrolysis ≥80%; guar gum; gum arabic; 2-hydroxyethylcellulose; hydroxypropyl methylcellulose; and polyethylene oxide having a $M_w$ from 100,000 to 1,000,000.

23. The article according to claim 22, wherein the article is a label or sheet.

24. An aqueous formulation comprising:
   a) palladium doped hydrogen-ZSM-5, wherein the Si:Al ratio of the hydrogen-ZSM-5 is less than or equal to 200:1;
   b) at least one water-soluble binder, wherein the water-soluble binder is selected from the group consisting of: at least one polyvinyl alcohol having a $M_w$ from 27,000 to 215,000 and a degree of hydrolysis ≥80%; guar gum; gum arabic; 2-hydroxyethylcellulose; hydroxypropyl methylcellulose; and polyethylene oxide having a $M_w$ from 100,000 to 1,000,000;
   c) and water.

25. An admix comprising:
   a) palladium doped hydrogen-ZSM-5, wherein the Si:Al ratio of the hydrogen-ZSM-5 is less than or equal to 200:1;
   b) at least one water-soluble binder, wherein the water-soluble binder is selected from the group consisting of: at least one polyvinyl alcohol having a $M_w$ from 27,000 to 215,000 and a degree of hydrolysis ≥80%; guar gum; gum arabic; 2-hydroxyethylcellulose; hydroxypropyl methylcellulose; and polyethylene oxide having a $M_w$ from 100,000 to 1,000,000.

* * * * *